Jan. 30, 1923.
F. K. EASTMAN.
VEHICLE DOOR CHECK.
FILED JAN. 27, 1922.
1,443,462.
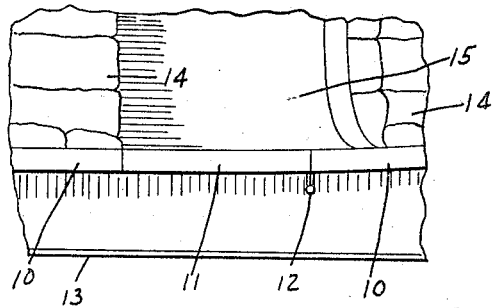
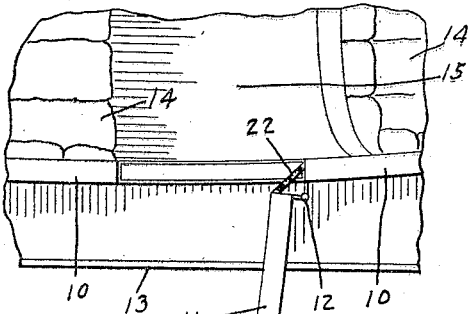
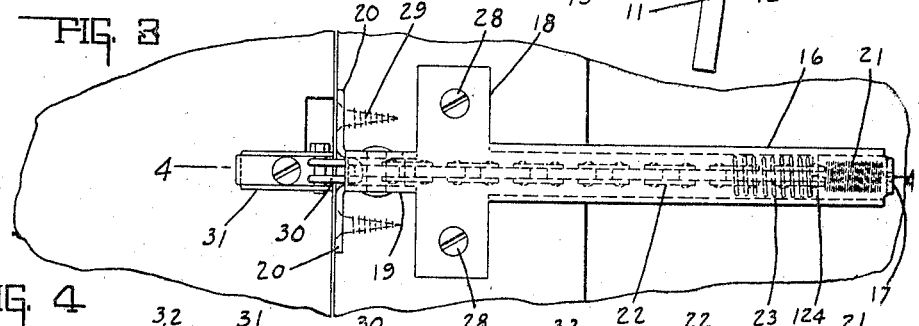
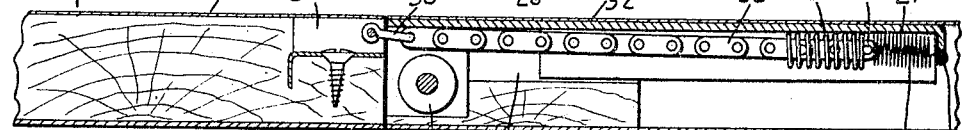
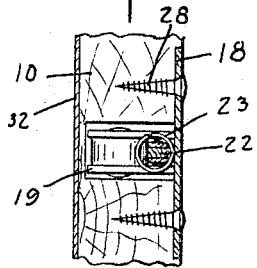
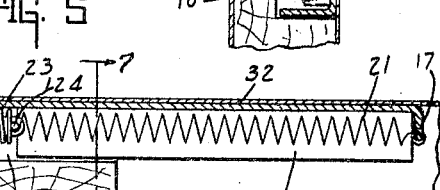
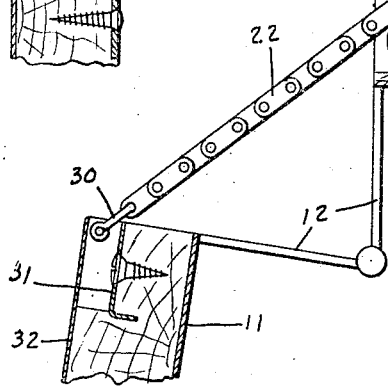
INVENTOR.
FLOYD K. EASTMAN.
BY
ATTORNEYS.

Jan. 30, 1923.
F. K. EASTMAN.
VEHICLE DOOR CHECK.
FILED JAN. 27, 1922.
1,443,462.
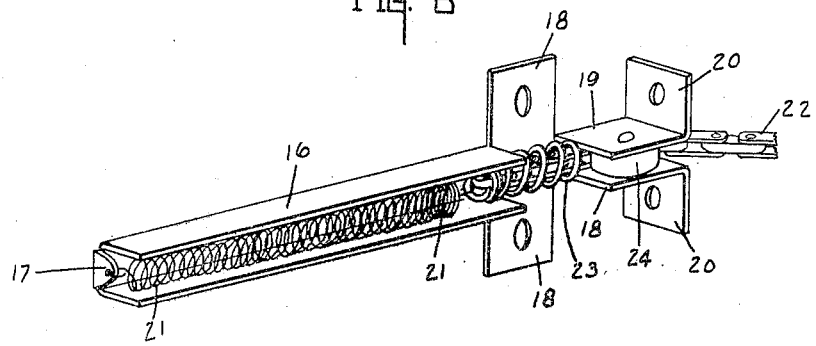
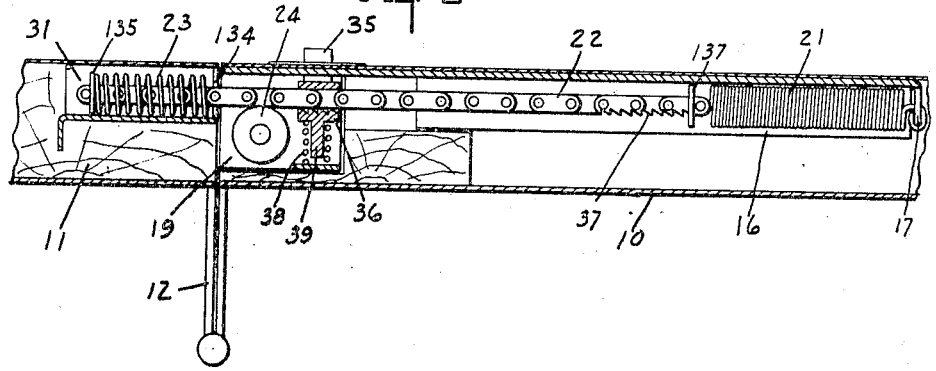
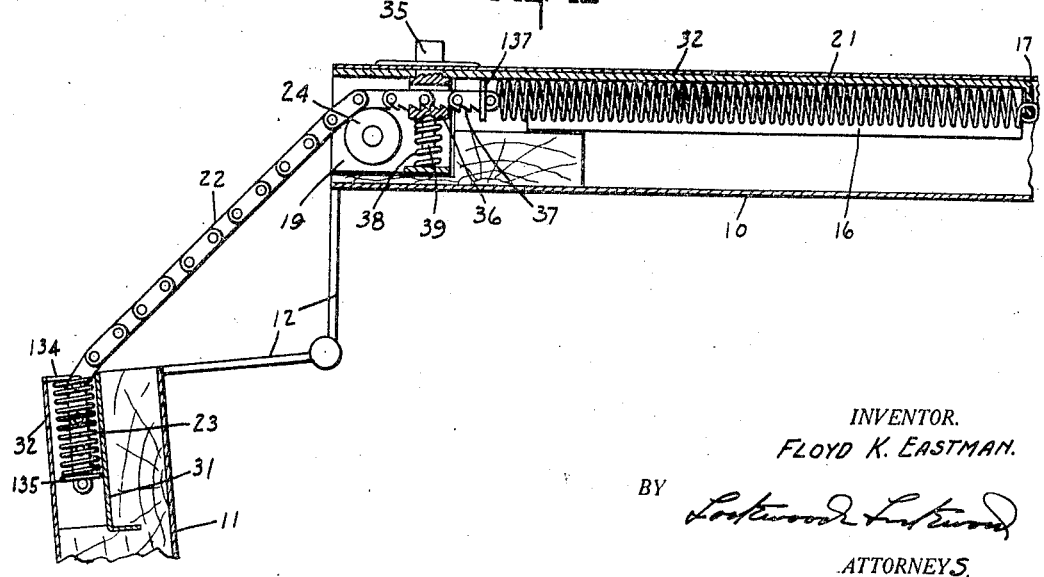
INVENTOR.
FLOYD K. EASTMAN.
BY
ATTORNEYS.

Patented Jan. 30, 1923.

1,443,462

UNITED STATES PATENT OFFICE.

FLOYD K. EASTMAN, OF KOKOMO, INDIANA.

VEHICLE DOOR CHECK.

Application filed January 27, 1922. Serial No. 532,136.

*To all whom it may concern:*

Be it known that I, FLOYD K. EASTMAN, a citizen of the United States, and a resident of Kokomo, county of Howard, and State of Indiana, have invented a certain new and useful Vehicle Door Check; and I do hereby declare that the following is a full, clear, and exact description thereof, reference being had to the accompanying drawings, in which like numerals refer to like parts.

The object of this invention is to furnish a practical and efficient door check for vehicle doors, and one which is entirely concealed when the door is closed and does not extend in the way of people using the vehicle when the door is open, and which not only checks the opening movement of the door but also withdraws into concealment the door check as the door is closed.

To the foregoing end the invention consists broadly in mounting in the door casing of the body of the automobile, in a concealed position, a casing, preferably of channel form, with means at its outer end providing a passageway for the reciprocatory movement of a chain or other flexible member, which at its outer end is connected with the door and on the inner end of said flexible connecting means there is a spring stopped by said guiding means for yieldingly checking the opening movement of the door, and another spring for withdrawing said flexible connection into concealment as the door is being closed.

The foregoing and other features of the invention will be understood from the accompanying drawings and the following description and claims.

In the drawings Fig. 1 is a horizontal section through a portion of an automobile body showing the door and door casing, parts being broken away. Fig. 2 is the same showing the door open and checked in its opening movement by the means herein provided for that purpose. Fig. 3 is an inside elevation of the adjacent parts of the right hand door of a vehicle and the door casing on the body of the car, and showing the door check construction, parts being broken away and parts shown by dotted lines. Fig. 4 is a horizontal section on the line 4—4 of Fig 3 for the left hand door of the vehicle. Fig. 5 is the same as Fig. 4 with the door open. Fig 6 is a section on the line 6—6 of Fig. 5. Fig. 7 is a section on the line 7—7 of Fig. 5. Fig. 8 is a perspective view of the channel bar member in the door casing of the body of the vehicle and parts therein, the side of said element shown being that extending toward the outside of the vehicle, and parts being broken away. Fig. 9 is a section like Fig. 4 of a modified form with the door closed, and Fig. 10 is a similar section with the door open.

In the drawings there is shown a portion of an automobile body, there appearing the side of the body portion 10, door 11, door hinge 12, running board 13, seats 14 and floor 15. These are, and may be so far as this invention is concerned, of standard form and construction. In carrying out this invention a sheet of metal is punched and bent into the channel construction 16 shown in Fig. 8. The major portion of it is channeled and at one end thereof there is an inturned lip 17. Upwardly and downwardly extending flanges 18 are left unbent with screw holes therein for securing this construction in place in the automobile body. Horizontally bent flanges 19 wider than the horizontal flanges in the main part of the channeled construction are provided within the outer end of the structure. Transversely and downwardly extending flanges 20 are provided at the extreme outer end with screws therein for securing them to the transverse face of the door frame of the body of the automobile.

In this channel frame construction 16 there is a relatively weak spiral wire 21 fastened at its inner end to the lip 17 on the channel frame and at the other end to the chain 22 which extends through said channel frame and between the horizontal plates or flanges 19 thereof. A stronger spiral wire 23 surrounds the inner end of the chain 22 with one end bearing against the pin 124, which serves as a stop for the spring 23, and it is of greater diameter than the distance between the two plates 19, as seen in Fig. 8, so that said plates serve as a stop by engaging the outer end of the spring 23 and thus yieldingly checking the outward movement of the chain 22, when the door is opened. Therefore, it is observed that the plates 19 are closer together than the sides of the main part of the channel frame 16, as seen in Fig. 8, and between said plates 19 there is an anti-friction roller 24 mounted, on the periphery of which the chain 22 operates as the chain moves inward and outward. The construction, therefore, provides a channel for the passage of the chain 22 between said roller 24 and the three walls of the channel frame at the flanges or plates 19.

The construction shown in Fig. 8, thus far described, is in the inner side of the wall of the body of the vehicle adjacent the hinged edge of the door. It may be, as shown in Fig. 4, embedded in the recess 27 channeled out of the inner surface of the vertical wall of the body in suitable shape to receive this construction and leave the inner wall of the vehicle flush, as shown by the dotted door checking construction, as in Fig. 3, but preferably it is covered by the lining 32 so that the same will be entirely concealed from the view of a person within the vehicle. As seen in Fig. 3 said door checking construction is secured in place by the screws 28 and 29 extending through the plates or flanges 18 and 20. The flanges 20 are embedded in suitable recesses so that they will be flush with the outer edge of the door frame of the vehicle on which the door is hinged. The hinges 12 are of the usual type extending outwardly, as shown in Figs. 4 and 5, so that when the door is open it has considerable swing.

The outer end of the flexible connection or chain 22 is pivoted by a link 30 to a short channel bar 31 embedded in the inner part of the door, as shown in Figs. 3, 4 and 5, so as to be flush with the inner surface of the door and preferably concealed by upholstering or a lining 32.

The door checking construction is mounted preferably between the upper and lower flanges of the door and operates in the manner shown in Figs. 4 and 5. When the door is closed the springs 21 and 23 are retracted and the chain is entirely within the channel frame mounted in the wall of the body of the vehicle where the parts are covered by the lining of the body of the vehicle on the door so as to be obscure. It is not visible from the exterior of the vehicle. When the door is swung open its connection with the chain 22 causes said chain to be drawn outward, and this movement will continue until checked by the spring 23 engaging the stop plates 19, which will yieldingly check the opening movement of the door. The weaker spring 21 will then be stretched, as shown in Fig. 5.

When the door is being closed, said spring 21 draws the chain 22 inward to the position shown in Fig. 4. In Fig. 3 the spring 21, while strong enough to withdraw the chain 22 while the door is being closed, is too weak to close the door by its own retractive power.

The modified form shown in Figs. 9 and 10 differs from that shown in the previous figures by the spring 21 being strong enough to close the door by its own power, and in that event a lock is provided which prevents the withdrawal of the chain 22 and the closing of the door until the button 35 is pressed outwardly by a person in the vehicle. This lock consists of a ratchet bar 36 connected with the button 35 and slidable transversely of the door checking construction. It has inwardly extending teeth, as shown, adapted to engage corresponding ratchet teeth 37 on the inner end of the chain 22 and is pressed into engagement with these teeth by the spring 38 surrounding a pin 39 and adapted to press the locking construction towards the inside of the vehicle. When a person in the car wishes to close the door, instead of getting out or reaching out of the vehicle and closing the door by hand, he simply pushes the button 35 into the position shown in Fig. 9 which releases the chain 22, and the spring 21 not only withdraws the chain 22 but pulls the door closed. In this construction the door checking spring 23 is placed on the outer end of the chain 22 around the chain in the channel frame 31 fastened to the door, and its ends are stopped by an end plate 34 on the channel frame 31 and a washer 135 on the end of the chain 32.

However, the invention broadly is not limited to either of the two positions shown on said spring 23, its only function being to yieldingly check the opening movement of the door. In the modified form shown in Figs. 9 and 10, the inner end of the chain 22 is checked by the washer 137, which is shown in both forms and which engages the plates 19 in the second form the same as the outer end of the spring 23 engages them in the first form of the invention.

It is observed that this door checking construction is concealed from view, either from the outside or the inside of the vehicle while the door is closed, and when the door is open only the chain 22 appears and it extends diagonally of the two wings of the hinge when it is open, as shown in Figs. 6 and 10 and, therefore, relatively out of the way of persons getting in or out of the vehicle. That is, it does not extend beyond the corner of the door frame and the corner of the door. Furthermore the opening movement of the door is yieldingly checked and the flexible connection 22 is withdrawn automatically when the door is closed, and if the button form shown in Figs. 9 and 10 be employed, the door will be automatically closed upon pressing the button when a person inside the vehicle wishes the door closed. The construction is relatively self contained as it is practically all within the channel frame 16, as shown in Fig. 8 and can be made independently of the vehicle.

The invention claimed is:

1. The combination with the body of a vehicle and a door hinged thereto, of a door check including a flexible connection operatively connected with one of said vehicle members and reciprocable in the other of said vehicle members, so that as the door is opened said flexible connection will be drawn out of one of said vehicle members, a spiral compression spring surrounding said flexible connection near one end thereof and in one of said vehicle members, a stop in said vehicle member for engaging said spring for yieldingly checking the opening movement of the door, and a spiral tension spring in one of said vehicle members for withdrawing and returning said connection into such vehicle member during the closing movement of the door.

2. The combination with the body of a vehicle and a door hinged thereto, of a door check including a flexible connection operatively connected with one of said vehicle members and reciprocable in the other member, so that as the door is opened said flexible conection will be drawn therefrom, cushion means at one end of said connection for yieldingly checking the opening movement of the door, and a tension spring for withdrawing said flexible connection of the vehicle during the closing movement of the door.

3. The combination with the body of a vehicle and a door hinged thereto, of a door check including a flexible connection operatively connected with one of said vehicle members and reciprocable in the other vehicle member, so that as the door is opened said flexible connection will be drawn out of one of said vehicle members, means for stopping the outward movement of said connection, means in one of said vehicle members for withdrawing and returning said connection into said vehicle member and closing the door, and releasable means for holding said flexible connection from movement when the door is opened and releasing the same for automatically closing the door.

4. The combination with the body member of a vehicle and a door member hinged thereto, of a door check construction including frame embedded in the inner surface of the one of said members and a connecting member secured to the other member, a spring in said frame having one end connected to the inner end thereof, a flexible connection in said frame with its inner end connected with said spring and with its outer end connected with said connecting member, means in connection with the frame for stopping the outward movement of the flexible connection when the door is being opened, and a compressible spring mounted on said flexible connection for causing said stopping movement to be gradual.

5. The combination with the body of a vehicle and a door hinged thereto, of a door check construction including a frame inserted in the body, another frame in the door, one of said frames in the body being provided with stop flanges, a flexible connection arranged loosely in said last mentioned frame and at its outer end connected with the other frame, so that as the door is being opened it will withdraw said flexible connection, a spring on said flexible connection for causing its stopping movement to be gradual, and a spring in the frame containing said connection, and attached thereto for withdrawing and returning the flexible connection into said frame as the door is being closed.

6. The combination with the body of a vehicle and a door hinged thereto, of a door check including a flexible connection connected with the door and extending into the body of the vehicle, a spring in the body of the vehicle strong enough to withdraw and return said flexible connection and close the door, means in the body of the vehicle for limiting the outward movement of said flexible connection and the opening movement of the door, spring held means within the body member for engaging the flexible connection when the door is open to temporarily prevent its return, and a push button for releasing said holding means to permit the spring to withdraw said flexible connection into the body portion and close the door.

7. The combination with the body of a vehicle and a door hinged thereto, of a door check construction including a frame in the body of the vehicle, a flexible connection yieldingly connected with the door and extending into said frame, a spring in said frame strong enough to return said flexible connection and close the door, said flexible connection having ratchet teeth on the outer edge thereof, a bar mounted transversely in said frame with inwardly extending ratchet teeth for engaging the ratchet teeth on the flexible connection, a spring for forcing said ratchet teeth into engagement with each other, and a button on the inside of the body of the vehicle for releasing said ratchet teeth, whereby the door will be automatically closed by said spring, and means on said frame for limiting the outward movement of the flexible connection.

8. The combination with the body of a vehicle, and a door hinged thereto, of a door check, including a connection operatively connected with one of said vehicle members, means on said connection for limiting the opening movement of said door, yielding means on said connection for closing said door, and means on one of said members for operatively engaging said connection for holding said door open when in one position and permitting the closing of said door when in the other position.

9. The combination with the body of a vehicle, and a door hinged thereto, of a door check including a connection operatively connected with one of said vehicle members and reciprocable in the other of said vehicle members, so that as the door is opened said connection will be drawn out of said vehicle member, means for stopping the outward movement of said connection, means for normally tending to close said door and withdraw said connection within the vehicle member, and means mounted upon one of said vehicle members for engaging said connection for permitting said door to remain open when in one position, and cause said door to be closed and said connection to be withdrawn into the vehicle body member when in the other position.

10. The combination with the body member of a vehicle, and a door member hinged thereto, of a door check construction comprising a flexible connection having one end connected to one of said members and the other end adapted to extend into the other member, means on said connection for limiting the opening movement of said door, and a spring attached to one end of said connection and to said last mentioned member which will permit the door to remain open, and withdraw said connection when the door is manually closed.

11. A door check for a vehicle door having a flexible member for limiting the opening movement of said door and adapted to be withdrawn into the vehicle upon said door being closed, and means for normally permitting the door to remain open, and withdrawing said connection when the door is manually closed.

In witness whereof, I have hereunto affixed my signature.

FLOYD K. EASTMAN.